US008850672B2

(12) United States Patent
Yang

(10) Patent No.: US 8,850,672 B2
(45) Date of Patent: Oct. 7, 2014

(54) ADVANCING MECHANISM FOR A FIXTURE

(76) Inventor: Ching-Chen Yang, Taichung (TW)

(*) Notice: Subject to any disclaimer, the term of this patent is extended or adjusted under 35 U.S.C. 154(b) by 345 days.

(21) Appl. No.: 13/151,274

(22) Filed: Jun. 2, 2011

(65) Prior Publication Data

US 2012/0304424 A1    Dec. 6, 2012

(51) Int. Cl.
*F16B 2/12* (2006.01)
*B25B 5/06* (2006.01)
*B25B 5/02* (2006.01)

(52) U.S. Cl.
CPC .. *F16B 2/12* (2013.01); *B25B 5/068* (2013.01)
USPC ........... 24/524; 24/522; 24/527; 269/6

(58) Field of Classification Search
CPC .................. B25B 5/068; F16B 2/12
USPC ........... 24/3, 6, 228, 457, 522, 524, 527, 568; 269/96, 143, 166–171.5, 208, 3, 6, 228
See application file for complete search history.

(56) References Cited

U.S. PATENT DOCUMENTS

| | | | | |
|---|---|---|---|---|
| 5,826,310 A * | 10/1998 | Hobday | | 24/514 |
| 5,853,168 A * | 12/1998 | Drake | | 269/6 |
| 6,338,475 B1 * | 1/2002 | Ping | | 269/6 |
| 7,017,894 B1 * | 3/2006 | Lin | | 269/6 |
| 7,513,492 B1 * | 4/2009 | Kuo | | 269/6 |
| 7,614,617 B2 * | 11/2009 | Marusiak | | 269/6 |
| 7,624,974 B2 * | 12/2009 | Zheng | | 269/6 |
| 2003/0080485 A1 * | 5/2003 | Lo | | 269/6 |
| 2005/0121842 A1 * | 6/2005 | Lo | | 269/6 |
| 2006/0226588 A1 * | 10/2006 | Khachatoorian et al. | | 269/6 |
| 2007/0176342 A1 * | 8/2007 | Noniewicz | | 269/6 |
| 2012/0098182 A1 * | 4/2012 | Yang | | 269/208 |
| 2013/0015617 A1 * | 1/2013 | Yang | | 269/208 |

* cited by examiner

*Primary Examiner* — Robert J Sandy
*Assistant Examiner* — Louis Mercado

(57) ABSTRACT

A fixture includes an elongated rod, a first jaw and a second jaw. The first jaw and the second jaw are assembled with the elongated rod. The second jaw has a pivotal portion and a grip. A trigger is connected outside the pivotal portion. A front chamber is formed in the pivotal portion for receiving a plurality of clasping pieces and a restoring spring penetrated by the elongated rod. The restoring spring pushes the clasping pieces to synchronously drive a push rod connected to the trigger. Each of the clasping pieces is formed with a groove facing the restoring spring. The restoring spring is formed with a guiding section bent toward the clasping pieces. The guiding section is disposed in the groove to guide the second jaw to advance smoothly.

1 Claim, 9 Drawing Sheets

ADVANCING MECHANISM FOR A FIXTURE

BACKGROUND OF THE INVENTION

1. Field of the Invention

The present invention relates to a jaw-advancing mechanism for a fixture.

2. Description of Prior Art

A fixture is a clamping tool for fixedly clamping an object. For example, several pieces of wood plates are clamped by a fixture, whereby the wood plates can be bonded together or processed by a machine simultaneously.

FIG. 1 shows a conventional fixture 10 having an elongate rod 11, a first jaw 20 and a second jaw 30, which is used in the field of furniture or woodworking. Both ends of the elongated rod 11 are formed with a post 12 to restrict the length of one end of the elongated rod 11 inserted into the first jaw 20. A positioning hole 13 is formed on the elongated rod 11 between its one end and the post 12. A fixing knob 21 passing through the first jaw 20 is disposed in the positioning hole 13, whereby the first jaw 20 can be fixed to one end of the elongated rod 11. If necessary, the first jaw 20 may be mounted to another end of the elongated rod 11.

The second jaw 30 is integrally formed with a pivotal portion 31 and a grip 40 by means of an injection molding process. The elongated rod 11 is disposed through the pivotal portion 31, so that the second jaw 30 and the grip 40 can reciprocate synchronously between the two posts 12 to thereby change the relative distance between the first jaw 20 and the second jaw 30. A trigger 50 is provided opposite to the grip 40. The trigger 50 has a forked end straddling the pivotal portion 31. The forked end is formed with a supporting portion 51. An edge of the supporting portion 51 is formed into a semi-circular surface for matching a curved wall 52 formed inside the pivotal portion 31 and supporting the trigger 50 to swing relative to the grip 40. Further, a push rod 53 is provided at the forked end of the trigger 50 to pass through the pivotal portion 31. The push rod 53 swings synchronously with the trigger 50 and prevents the trigger 50 from leaving the pivotal portion 31.

The interior of the pivotal portion 31 is divided into two space including a front chamber 32 and a rear chamber 33. The front chamber 32 is a space defining a region adjacent to the curved wall 52, and the rear chamber 33 is a space adjacent to the front chamber 32. The elongated rod 11 is disposed through the front chamber 32 and the rear chamber 33. Three clasping pieces 34 and a restoring spring 35 are received in the front chamber 32. The middle portion of each clasping piece 34 is provided with a rectangular through-hole 39 for allowing the elongated rod 11 to pass through. The restoring spring 35 abuts against an inner wall of the front chamber 32 to thereby push the clasping pieces 34 to advance in such a manner that the clasping pieces 34 are substantially kept perpendicular to the elongated rod 11. In this way, the inner edge of the rectangular hole 39 will not rub against the elongated rod 11. Further, the lower edge of the clasping piece 34 abuts against the push rod 35, thereby causing the trigger 50 to swing in the same direction.

A triggering piece 36, a damping piece 37 and a compression spring 38 are received in the rear chamber 33. The triggering piece 36 is brought into contact with the damping piece 37. The elongated rod 11 is disposed through the triggering piece 36, the damping piece 37 and the compression spring 38. The compression spring 38 abuts against an inner wall of the rear chamber 33 and the damping piece 37 to push the triggering piece 36 to be inclined with respect to the elongated rod 11. As a result, the second jaw 30 can stop on the elongated rod 11. A release button 41 is provided on an outer surface of the grip 40 for driving the triggering piece 36. When a user presses the release button 41 by his/her finger, the release button 41 drives the triggering piece 36 and the damping piece 37 to swing in a direction perpendicular to the elongated rod 11, thereby releasing the second jaw 30. As a result, the second jaw 30 can advance along the elongated rod 11 to press the compression spring 38.

As shown in FIG. 2, when an external force F is applied to the trigger 50 to cause the trigger 50 to swing toward the grip 40 by using the supporting portion 51 as a center of rotation, the push rod 53 pushes the clasping pieces 34 to get an inclined position relative to the elongated rod 11. At this time, the outer periphery of the elongated rod 11 touches the inner edges of the rectangular holes 39 of the clasping pieces 34, thereby generating a reaction moment to prevent the clasping pieces 34 from moving relative to the elongated rod 11. Since the external force F is larger than the stopping force caused by the clasping pieces 37 on the elongated rod 11, the push rod 53 of the trigger 50 can abut against the lower edges of the clasping pieces 34 to swing continuously, thereby driving the second jaw 30 to move a certain distance in the direction of the arrow D. Thus, the clasping pieces 34, the restoring spring 35 and the trigger 50 constitute an advancing mechanism to help the second jaw 30 to move on the elongated rod 11.

Please refer to FIG. 3. When the external force is released, the trigger 50 cannot oppose against the stopping force caused by the clasping pieces 37 on the elongated rod 11, which causes the second jaw 30 to stop on the elongated rod 11 at a new position. At this time, the clasping pieces 34 are pushed by the elastic force of the restoring spring 35 to counteract with the reaction moment applied on the elongated rod 11. As a result, the clamping forces 37 move in the direction of the arrow d, whereby the push rod 53 drives the trigger 50 to swing outwards around the supporting portion 51 away from the grip 40.

However, such a conventional fixture has a problem that the second jaw 30 may be unable to advance sometimes. The reason is as follows. As shown in FIG. 2, the restoring spring 35 is a wound metallic coil. The winding of the coil (especially its end) contacting the clasping piece 34 may overlap on a region adjacent to the outer periphery or inner diameter of the next winding of the coil, which impedes the extension of the restoring spring 35. As a result, the clasping pieces 34 no longer tightly contact the push rod 53, so that the trigger 50 is loosened and unable to drive the second jaw 30 to advance continuously. At this time, the fixture cannot be used unless the user pulls the trigger 50 for several times until the coil of the restoring spring 35 returns to its original shape. Therefore, it is an important issue to solve this problem.

In view of the above, the present inventor proposes a novel and improved fixture based on his expert experience and delicate researches.

SUMMARY OF THE INVENTION

In order to solve the above problem, the primary objective of the present invention is to overcome the overlapping of the restoring spring to thereby guide the second jaw to advance smoothly.

In order to achieve the above objective, the present invention is to provide an advancing mechanism of a fixture. The fixture includes an elongated rod, a first jaw and a second jaw. The first jaw and the second jaw are assembled with the elongated rod. The second jaw has a pivotal portion and a grip. A trigger is connected outside the pivotal portion. The interior of the pivotal portion is formed with a front chamber for receiving a plurality of clasping pieces and a restoring spring penetrated by the elongated rod. The restoring spring pushes the clasping pieces to drive a push rod connected to the trigger synchronously. The clasping piece is formed with a groove facing the restoring spring. The restoring spring is formed with a guiding section bent toward the clasping piece. The guiding section is disposed into the groove of the clasping piece, thereby guiding the second jaw to advance smoothly.

By this arrangement, the guiding section is disposed in the groove, so that the restoring spring cannot rotate around the elongated rod. When the clasping pieces press the restoring spring, the pressing force is first applied to the guiding section, so that the guiding section forces the restoring spring to generate an elastic deformation to prevent the overlapping of the coil of the restoring spring. In this way, the second jaw can advance smoothly.

The above objectives and structural and functional features of the present invention will be described in more detail with reference to preferred embodiments thereof shown in the accompanying drawings

DETAILED DESCRIPTION OF THE INVENTION

Figure 1:
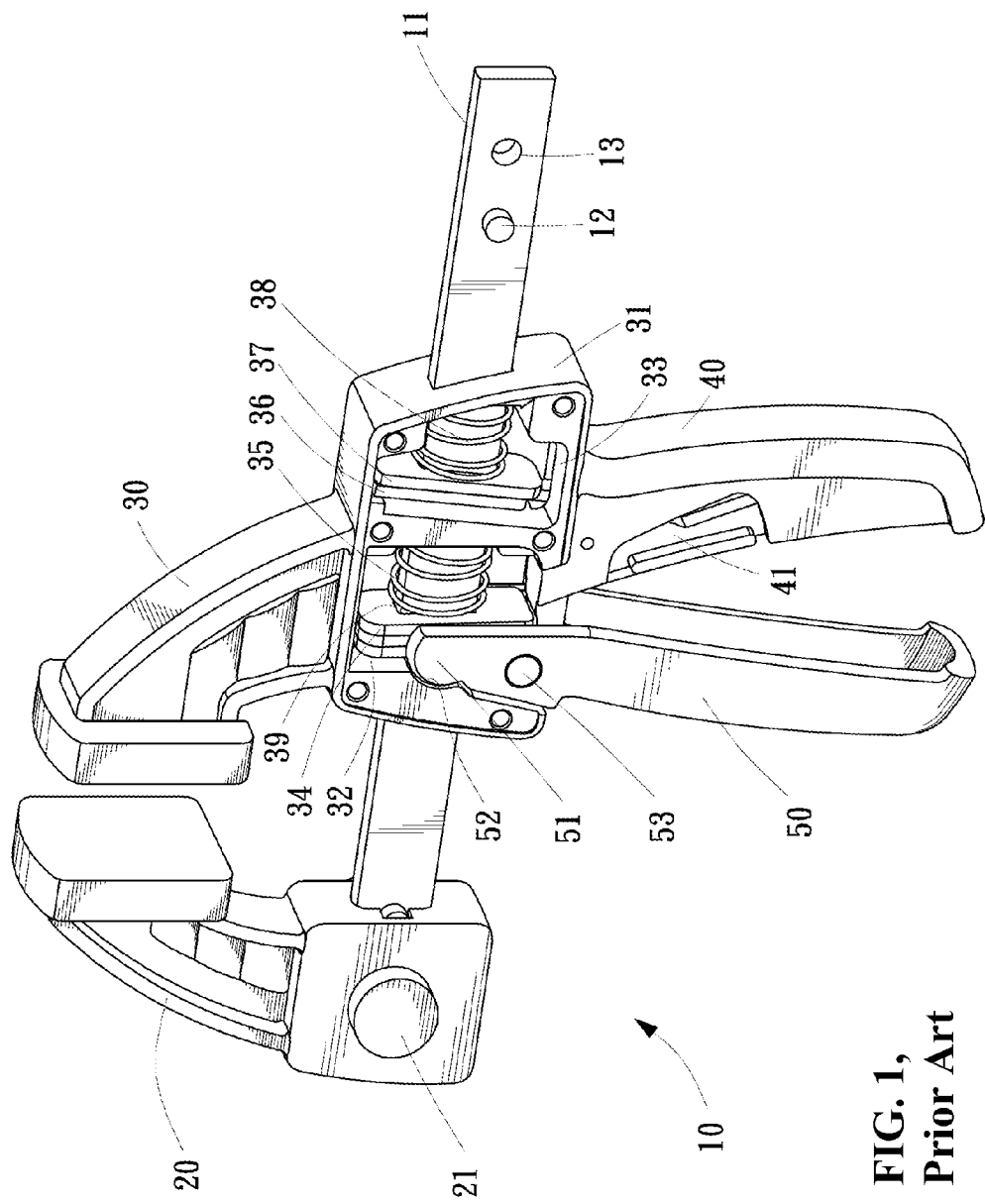
FIG. 1 is a perspective view showing a conventional fixture.
Figure 2:
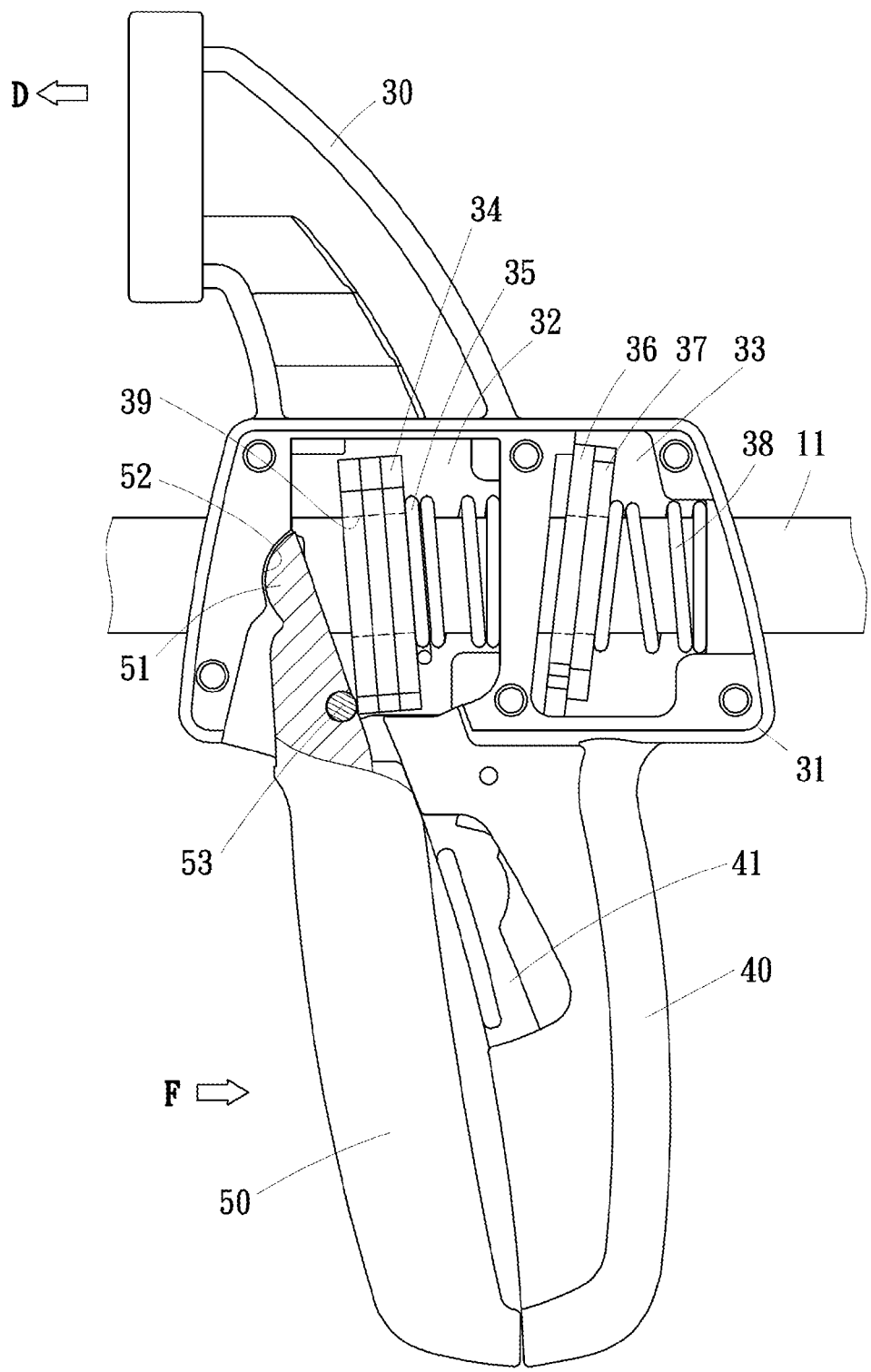
FIGS. 2 and 3 are plan views showing continuous actions of a second jaw of the conventional fixture in FIG. 1.
Figure 3:
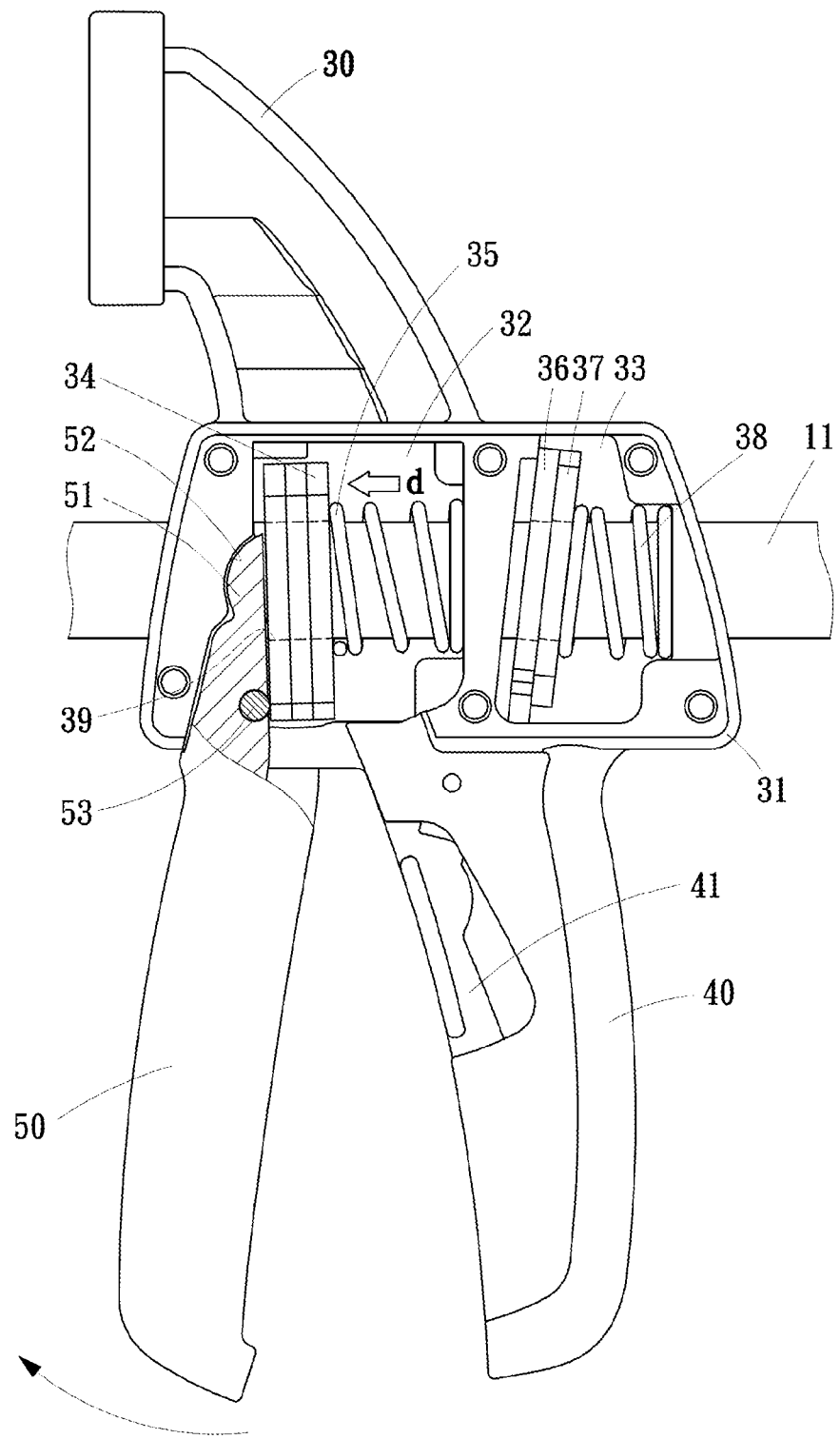
Figure 4:
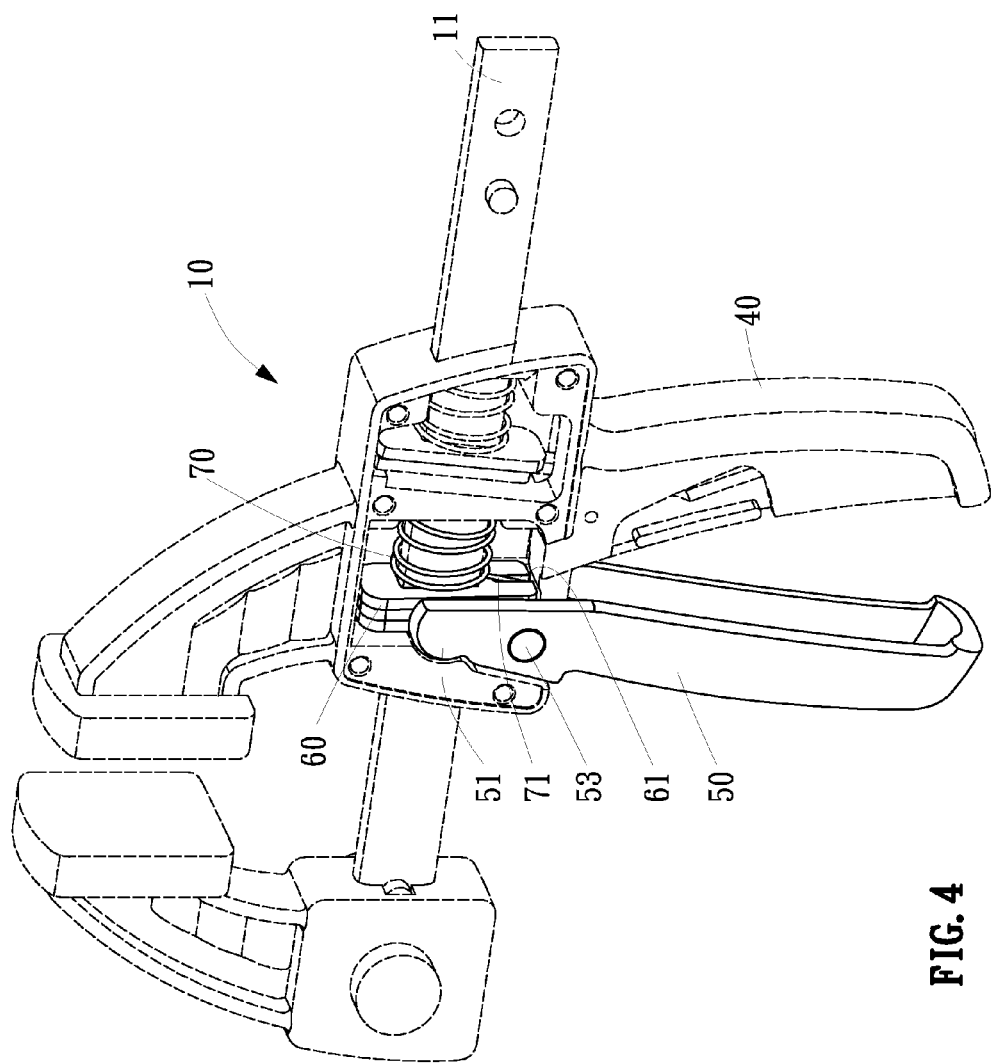
FIG. 4 is a perspective view showing an advancing mechanism according to a first preferred embodiment of the present invention, in which the fixture is depicted by dotted lines.

FIG. 4 shows the fixture 10 mentioned in the Section of "Description of prior art". The same structural parts and functions of the fixture 10 which are mentioned in the above will be omitted for simplicity.

In the front chamber 32, each of clasping pieces 60 is formed into an angled shape. The lower portion of the clasping piece 60 contacting a restoring spring 70 is formed with a groove 61 for receiving a guiding section 71 of the restoring spring 70 which is bent toward the clasping piece 60. Since the guiding section 71 is received in and restricted by the groove 61, the restoring spring 70 cannot rotate around the elongated rod 11.

Figure 5:
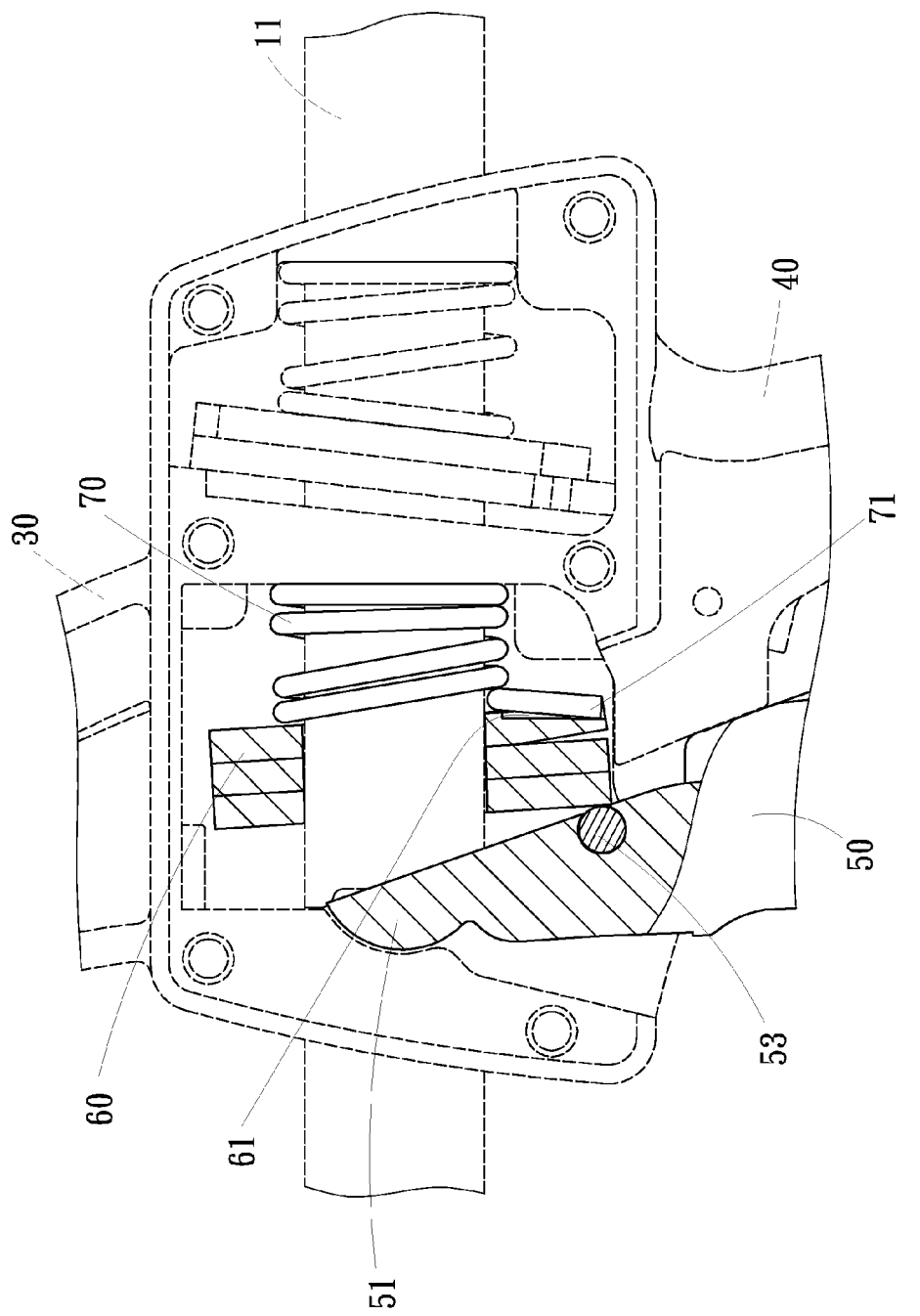
FIGS. 5 and 6 are enlarged plan views showing continuous actions of the advancing mechanism of FIG. 4.

Please refer to FIG. 5. The bottom of the groove 61 is kept inclined and brought into point contact with the end of the guiding section 71. When the push rod 53 pushes the lower edges of the clasping pieces 60, the pressing force is first applied to the guiding section 71, thereby forcing the restoring spring 70 to generate an elastic deformation and preventing the overlapping of the coil of the restoring spring 70. As a result, the second jaw 30 can advance smoothly along the elongated rod 11.

Figure 6:
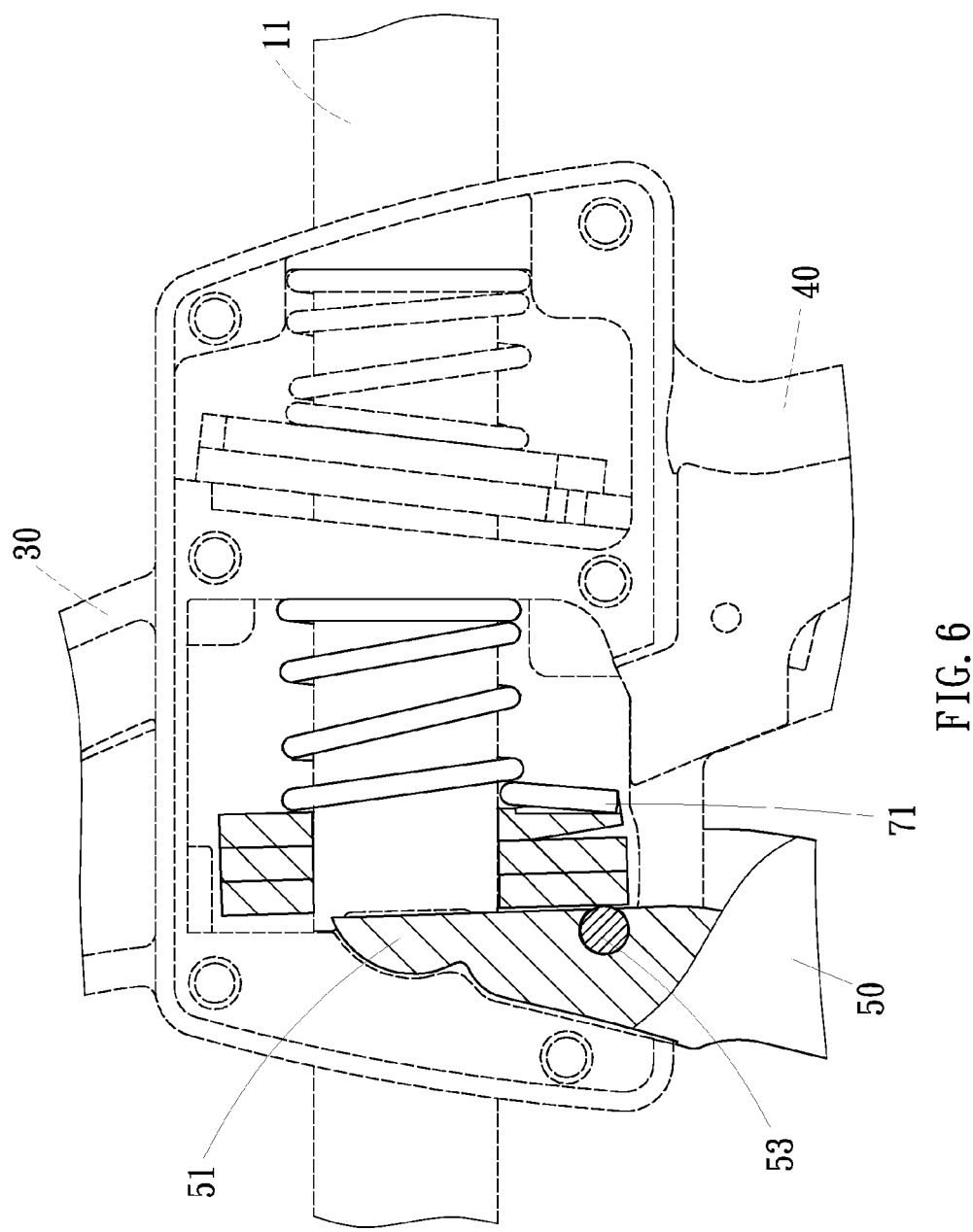

Please refer to FIG. 6. The elastic force of the restoring spring 70 is exerted to the guiding section 71 to push the clasping piece 60 to return to its original position. As a result, the clasping piece 60 drives the push rod 53 of the trigger 50 to swing outwards around the supporting portion 51 away from the grip 40.

Figure 7:
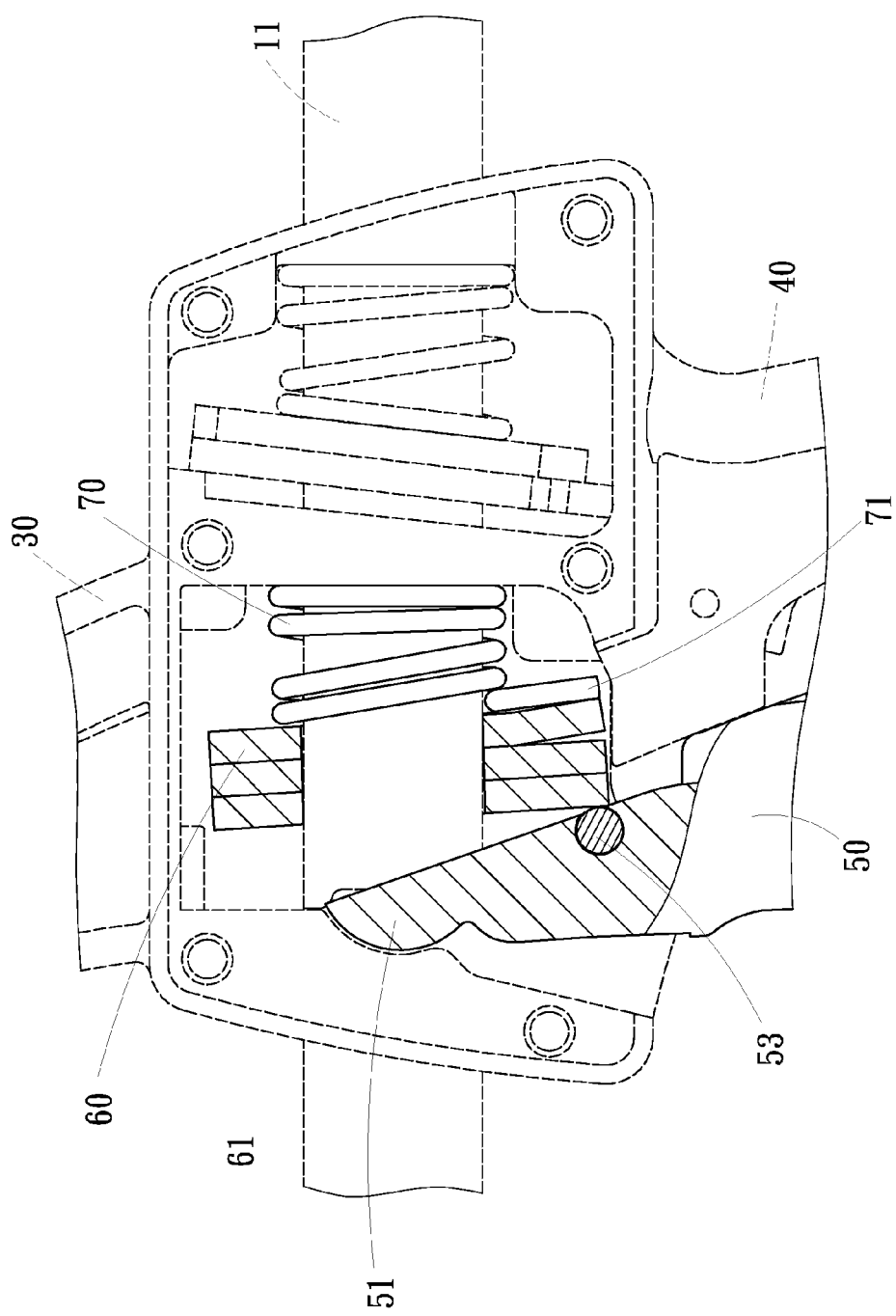
FIG. 7 is a plan view showing a second preferred embodiment of the present invention.

Based on the above-mentioned structure, the following embodiments are developed. Please refer to FIG. 7. The clasping piece 60 is not provided with a groove 61. However, the clasping piece 60 can still generate a pushing force to make the fixture to clamp an object.

Figure 8:
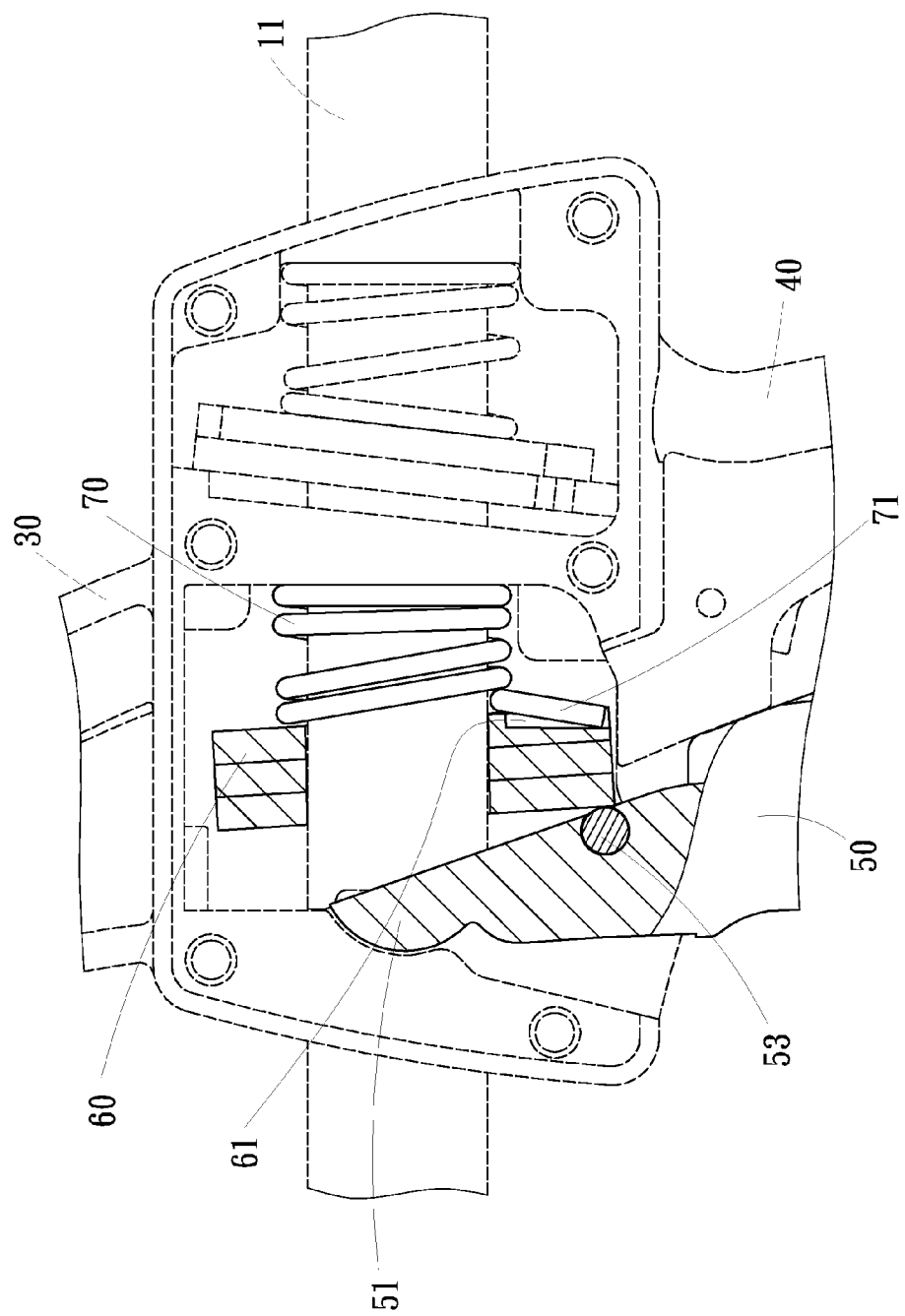
FIG. 8 is a plan view showing a third preferred embodiment of the present invention.

Please refer to FIG. 8. The clasping piece 60 is formed into a planar piece without an angled shaped construction. The interior of each clasping piece 60 is similarly provided with a groove 61, so that a plurality of clasping pieces 60 can be tightly connected together with increased frictional force. This embodiment can generate the same effect as the previous embodiments.

Figure 9:
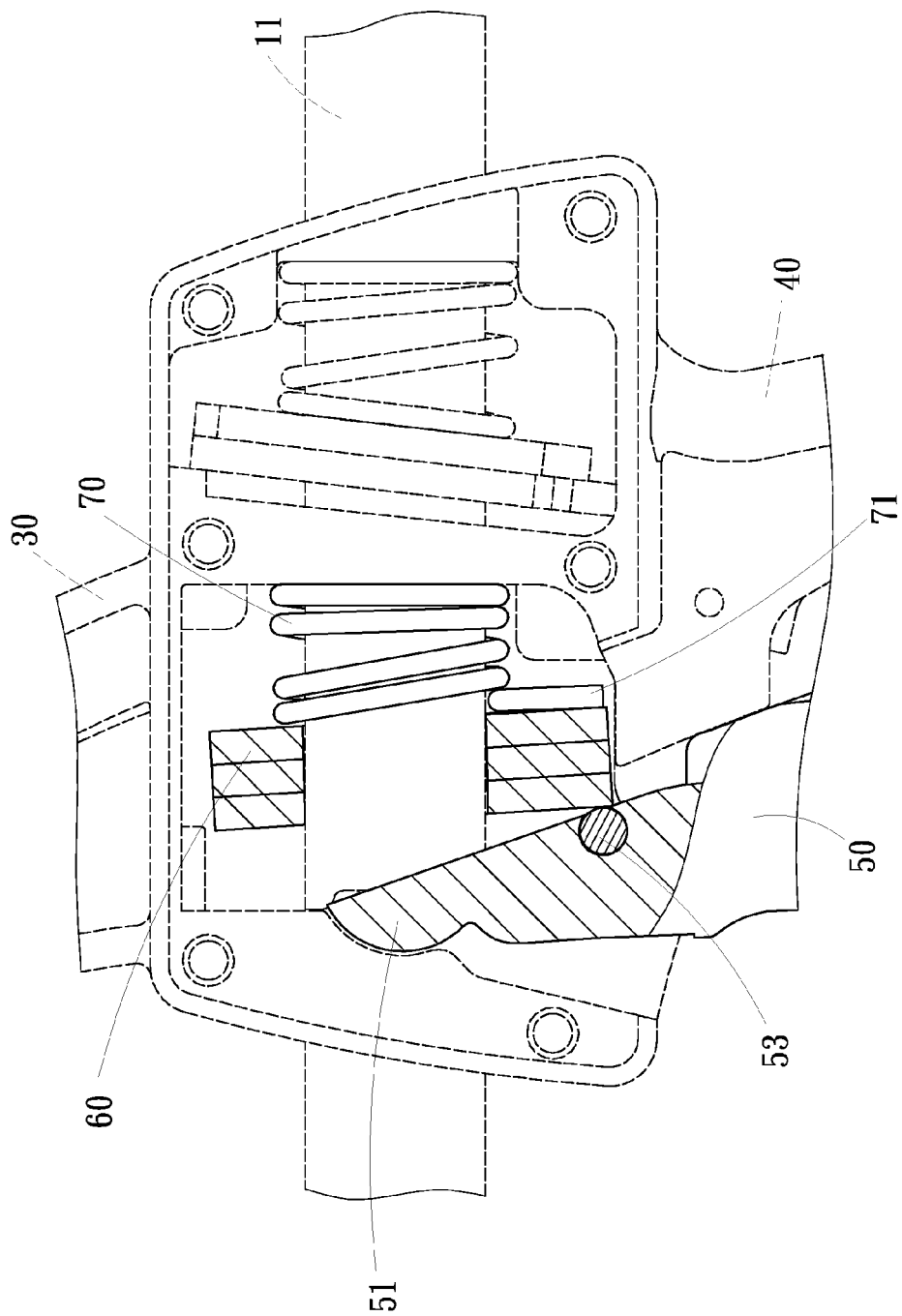
FIG. 9 is a plan view showing a fourth preferred embodiment of the present invention.

Please refer to FIG. 9. The clasping piece 60 is formed into a planar piece, which abuts against the guiding section 71 of the restoring spring 70. The push rod 53 presses the clasping pieces 60 to make the second jaw 30 to advance.

Although the present invention has been described with reference to the foregoing preferred embodiments, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. An advancing mechanism for a fixture, the fixture including an elongated rod, a first jaw and a second jaw, the first jaw and the second jaw being assembled with the elongated rod, the second jaw having a pivotal portion and a grip, a trigger being connected outside the pivotal portion, a front chamber being formed in the pivotal portion for receiving a plurality of clasping pieces and a restoring spring penetrated by the elongated rod, the restoring spring pushing the clasping pieces to synchronously drive a push rod connected to the trigger;

characterized in that: a clasping piece facing the restoring spring is formed into an angled shape with a tapered groove, the restoring spring is formed with a guiding section bent toward the clasping pieces, the guiding section is disposed in the groove to guide the second jaw, and a bottom of the groove is inclined.

* * * * *